US006819538B2

(12) United States Patent
Blaauw et al.

(10) Patent No.: US 6,819,538 B2
(45) Date of Patent: Nov. 16, 2004

(54) METHOD AND APPARATUS FOR CONTROLLING CURRENT DEMAND IN AN INTEGRATED CIRCUIT

(75) Inventors: David T. Blaauw, Austin, TX (US); Rajendran V. Panda, Round Rock, TX (US); Rajat Chaudhry, Austin, TX (US); Vladimir P. Zolotov, Cedar Park, TX (US); Ravindraraj Ramaraju, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 478 days.

(21) Appl. No.: 09/858,126

(22) Filed: May 15, 2001

(65) Prior Publication Data

US 2002/0171407 A1 Nov. 21, 2002

(51) Int. Cl.[7] .................................................. H02H 3/00
(52) U.S. Cl. .............................. 361/90; 361/18; 361/58; 361/100
(58) Field of Search ............................. 361/90, 58, 78, 361/100, 18, 91.1, 115

(56) References Cited

U.S. PATENT DOCUMENTS

| 5,838,145 A | 11/1998 | Poon |
| 5,963,023 A | * 10/1999 | Herrell et al. ............... 323/265 |
| 6,028,417 A | 2/2000 | Ang et al. ................... 323/209 |
| 6,069,521 A | 5/2000 | Taylor et al. ............... 327/540 |

FOREIGN PATENT DOCUMENTS

| EP | 0724209 A1 | 7/1996 |
| EP | 1089217 A1 | 4/2001 |

OTHER PUBLICATIONS

PCT International Search Report.
Pant et al., "An Architectural Solution for the Inductive noise Problem due to Clock–Gating," ISLPED99, San Diego, CA, pp. 255–257 (1999).
Pant et al., "Inductive Noise Reduction at the Architectural Level," Georgia Institute of Technology, Intel Corporation, 6 pgs.
Ang, "An On–chip Voltage Regulator using Switched Decoupling Capacitors," IEEE International Solid–State Circuits Coference, p. 438–439 (2000).
Heald, "A Third–Generation SPRC V9 64–b Microprocessor," IEEE, pp. 1526–2000 (2000).

* cited by examiner

Primary Examiner—Stephen W. Jackson
(74) Attorney, Agent, or Firm—Joanna G. Chiu; Susan C. Hill (57) ABSTRACT

The present invention relates generally methods and apparatus for controlling current demand in an integrated circuit. One embodiment relates to a method that includes detecting if a supply voltage overshoot or a undershoot is present or anticipated, and if detected, controlling current consumed by a power consumption circuitry to ensure that the power supply voltage remains within acceptable levels. Other embodiments relate to an integrated circuit having a capacitive decoupling structure, power consumption circuitry, and power consumption control circuitry for controlling current consumed by at least a portion of the power consumption circuitry. Therefore, embodiments of the invention relate to monitoring and controlling power consumption (i.e. current demand) of a power consumption circuit (such as an integrated circuit) in order to prevent devastating supply voltage undershoots, overshoots, and oscillations.

19 Claims, 5 Drawing Sheets

METHOD AND APPARATUS FOR CONTROLLING CURRENT DEMAND IN AN INTEGRATED CIRCUIT

FIELD OF THE INVENTION

This invention relates generally to integrated circuits, and more particularly to controlling current demand in an integrated circuit.

RELATED ART

Power supply voltage of a microprocessor, microcontroller, or any other type of integrated circuit or chip deteriorates with voltage undershoots and overshoots caused by changes in its power demand. Changes in power demand may occur when different instruction streams executed by an integrated circuit have different power demands, and in some situations, the change is drastic, such as when the integrated circuit comes out of or goes into a sleep state. This causes a problem in that the integrated circuit will malfunction if the power supply voltage varies beyond acceptable limits.

The large voltage variations during a drastic change of current are created mainly by the parasitic inductors in the package, bond wires, an on-chip interconnects. Therefore, the amount of overshoot or undershoot of the power supply voltage is directly proportional to $dI/dt \cdot \sqrt{L/C}$, where L is the inductance of the package and on-chip interconnects and C is the integrated circuit (or on-chip) decoupling capacitance.

One solution to address this problem is to increase the integrated circuit decoupling capacitance such that the amount of voltage overshoot or undershoot is decreased. However, the feasibility of larger integrated circuit decoupling capacitors as a solution is limited due to the large area required within the integrated circuit to place these decoupling capacitors. Also, the effectiveness of any increased amount of decoupling capacitance is decreased since the amount of overshoot or undershoot of the power supply voltage is proportional to the square root of the increase of the decoupling capacitance. Furthermore, the problem of supply voltage overshoot and undershoot becomes increasingly worse as microprocessors, microcontrollers, or other integrated circuits become faster and current consumption is increased. Therefore, a need exists to monitor and control power supply voltage overshoots and undershoots in order to remain within acceptable limits.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The terms "assert" and "negate" (or "deassert") is used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Embodiments of the present invention relate generally to monitoring and controlling power consumption (i.e. current demand) of a power consumption circuit (such as an integrated circuit) in order to prevent devastating supply voltage undershoots, overshoots, and oscillations. For example, one aspect of the present inventions relates to a method for controlling current demand in an integrated circuit, the integrated circuit having power consumption circuitry. The method includes detecting if at least one of a predetermined overshoot and a predetermined undershoot is present or anticipated in a power supply voltage, and if one of the predetermined overshoot or predetermined undershoot is detected in the power supply voltage, controlling current consumed by the power consumption circuitry to ensure that the power supply voltage will remain within a predetermined margin of a predetermined power supply voltage level.

Another aspect of the present invention relates to an integrated circuit comprising a capacitive decoupling structure for providing current when the power supply voltage level is decreasing and for consuming current when the power supply voltage level is increasing. The integrated circuit also comprises power consumption circuitry for consuming power and power consumption control circuitry for controlling current consumed by at least a portion of the power consumption circuitry, where the power consumption control circuitry is coupled to the power consumption circuitry.

Yet another aspect of the present invention relates to an integrated circuit comprising power consumption circuitry for consuming power and power consumption control circuitry, coupled to the power consumption circuitry, for controlling current consumed by at least a portion of the power consumption circuitry. The power consumption control circuitry comprises monitoring circuitry for comparing a power supply voltage to a predetermined voltage. The integrated circuit also comprises clock adjusting circuitry coupled to the power consumption control circuitry, the clock adjusting circuitry adjusting a clock signal which is provided to a portion of the power consumption circuitry.

Figure 1:
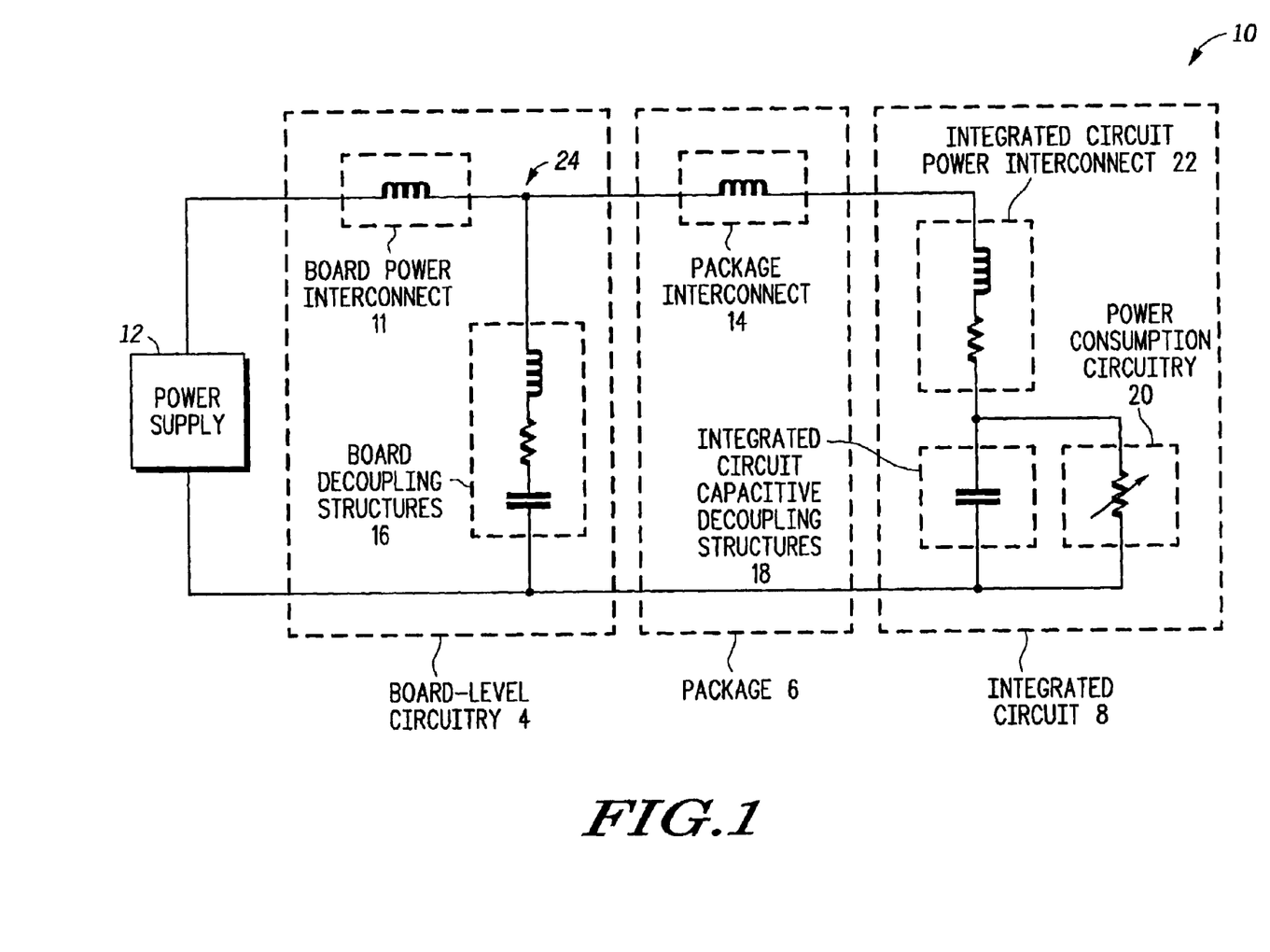
FIG. 1 illustrates, in partial block-diagram form and partial schematic form, a system according to one embodiment of the present invention.

FIG. 1 illustrates a system 10 in accordance with one embodiment of the present invention. FIG. 1 is a simplified, approximate circuit model of system 10. In one embodiment, system 10 is a power supply VLSI system. Therefore, system 10 may include other or different inherent or parasitic components than those illustrated in FIG. 1. System 10 includes a power supply 12 coupled to board-level circuitry 4 which is coupled to a package 6 which is coupled to an integrated circuit 8. Board-level circuitry 4 includes board power interconnects 12 coupled to board decoupling structures 16. Package 6 includes package interconnect 14, and integrated circuit 8 includes integrated circuit power interconnect 22 coupled to integrated circuit capacitive decoupling structures 18, and power consumption circuitry 20. Integrated circuit decoupling structures 18 and power consumption circuitry 20 are also coupled to power supply 12 and board decoupling structures 16.

System 10 illustrates current flow from power supply 12 to power consumption circuitry 20. Power supply 12 intends to supply a constant voltage. For example, power supply 12 may be a power regulator, battery, or the like. Also note that power supply 12 may be included as part of the circuit board such as board-level circuitry 4, or may be an external power supply as illustrated in FIG. 1 (such as, for example, in automotive applications). Current flows from power supply 12 through board-level circuitry 4. Board-level circuitry 4 includes board power interconnects 12 which represent the inherent, parasitic inductance of the circuit board power routes. Also, board-level circuitry 4 may include board decoupling structures 16 which, in one embodiment (as illustrated in FIG. 1), is a discrete capacitor component. This discrete capacitor component includes inherent resistances and inductances, as illustrated in board decoupling structures 16 of FIG. 1. Current then flows from board-level circuitry 4 through the package leads included in package 6. These package leads also include an inherent, parasitic inductance as illustrated by package interconnect inductance 14. Current then flows through integrated circuit power interconnects 22 before reaching the devices within power consumption circuitry 20. Integrated circuit power interconnect 22 is modeled by a resistor and inductor in system 10.

After flowing through integrated circuit interconnect 22, the current reaches power consumption circuitry 20 which is represented in FIG. 10 as a variable resistor (i.e. variable load). For example, power consumption circuitry 20 may include operational circuitry such as the logic gates of a microprocessor core. However, in alternative embodiments, power consumption circuitry 20 may include any circuitry that is involved in the operation of integrated circuit 8 and requiring current. That is, power consumption circuitry 20 generally performs some function other than merely providing and receiving currents.

In parallel to power consumption circuitry 20 is integrated circuit capacitive decoupling structures 18. These decoupling structures 18 may be formed in a variety of ways. For example, in one embodiment, these may be passive elements such as a capacitor, or, in alternate embodiments, may be active devices such as MOS transistors configured as capacitive elements. Integrated circuit capacitive decoupling structures 18 provide appreciable current to power consumption circuitry 20 while the power supply voltage level decreases, and likewise, consumes current while the power supply voltage level increases. Therefore, the function of integrated circuit capacitive decoupling structures 18 is to either provide or consume current in response to the power supply voltage from power supply 12. (Note also that integrated circuit capacitive decoupling structures 18 generally performs no other function within system 10 other than supplying or consuming current.)

It can be appreciated that system 10 of FIG. 1 is simply an approximation of the inherent parasitics or actual components involved. Therefore, it can be understood by those of ordinary skill in the art that a packaged integrated circuit coupled to a circuit board can be represented in a variety of ways. For example, system 10 may utilize a more complicated or further simplified representation.

If there is sufficient capacitance provided by board-level decoupling structures 16, board-level decoupling structures 16 effectively shield package 6 from the inductance introduced by board power interconnect 11 such that a nominally constant voltage appears at node 24. However, even though the inductance of board-level circuitry 4 can be shielded by sufficiently high board decoupling structures 16, parasitic inductance is introduced after node 24 by package interconnect 14. Therefore, the power supply voltage overshoot and undershoot is directionally proportional to $dI/dt \cdot \sqrt{L/C}$, where L is the inductance of package 6 (that is, of package interconnect 14) and of integrated circuit power interconnect 22 and C is the capacitance provided by integrated circuit capacitive decoupling structures 18, and $dI/dt$ refers to the rate of change of the current demanded by power consumption circuitry 20.

Therefore, as discussed above, in order to decrease the magnitude of supply voltage overshoot and undershoot, the package inductance (L) can be decreased or the integrated circuit decoupling capacitance (C) can be increased. However, as discussed above, limits exist to increasing the value of C and decreasing the value of L. For example, as discussed above, in order to increase C, more area is required within integrated circuit 8. Also, as technology improves and more complex integrated circuits are manufactured, it is unlikely that the parasitic inductance of the package will decrease. For example, since the parasitic inductance of package interconnect 14 and of integrated circuit power interconnect 22 is associated with the physical dimensions of the integrated circuit and package, there exist limitations on reducing L beyond a certain level. Furthermore, the effectiveness of increasing C or decreasing L is diminished since L/C is within the square root radical (e.g. a decrease of 9 achieved by increasing C and/or decreasing L translates into an actual decrease of only 3). Embodiments of the present invention thus provide solutions that focus on decreasing $dI/dt$ in order to decrease the amount of supply voltage overshoot or undershoot. For example, to decrease $dI/dt$, $dI$ can be decreased or $dt$ can be increased, or any combination of the two, in order to help control supply voltage overshoot and undershoot. Therefore, a method for monitoring the supply voltage and controlling the current demand of power consumption circuitry 20 can effectively decrease $dI/dt$, as will be discussed further below. (Also note that embodiments of the present invention may also increase the effective decoupling capacitance (C) when the clock is adjusted in order to decrease current demand.)

Figure 2:
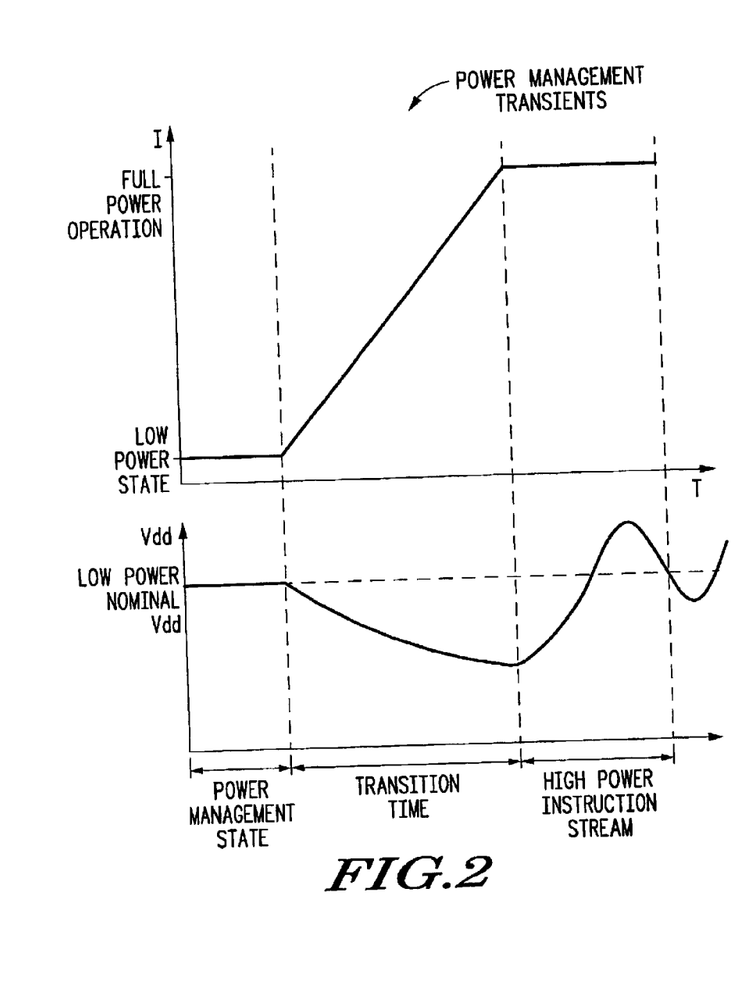
FIG. 2 illustrates current and voltage waveforms corresponding to power management transients.
Figure 3:
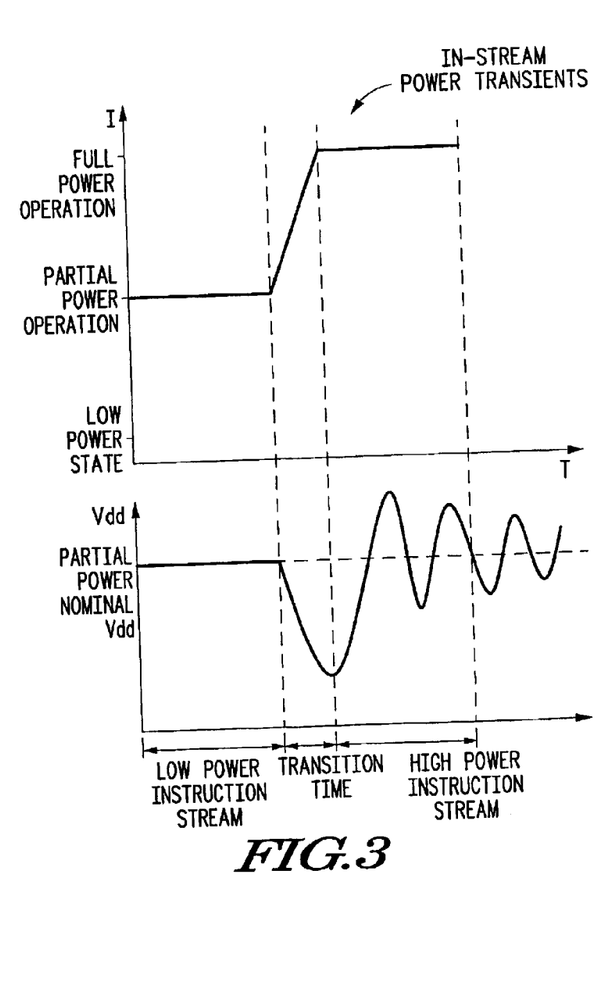
FIG. 3 illustrates current and voltage waveforms corresponding to in-stream power transients.
Figure 4:
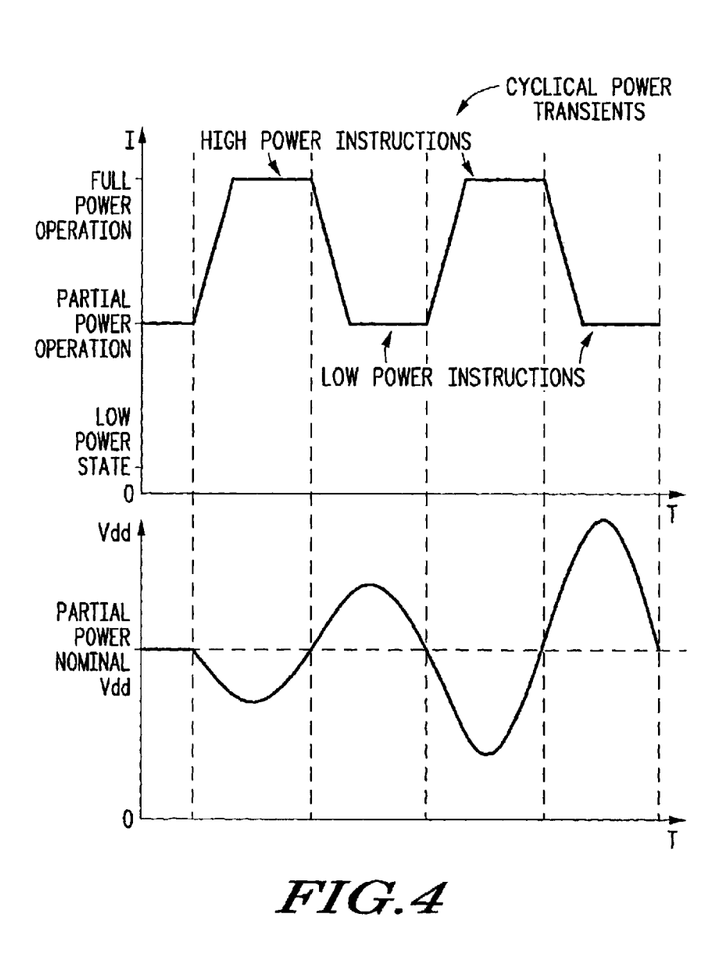
FIG. 4 illustrates current and voltage waveforms corresponding to cyclical power transients.

FIGS. 2–4 illustrate various current (I) and voltage (Vdd) waveforms where I refers to the current consumed by power consumption circuitry 20 and Vdd to the supply voltage as seen by the devices of power consumption circuitry 20. Note that the voltage waveforms correspond in time to the current waveforms and illustrate the response of Vdd to the current as the current consumption of power consumption circuitry 20 changes. The waveforms of FIGS. 2–4 help illustrate examples of current changes that cause supply voltage overshoots and undershoots.

FIG. 2 illustrates current and voltage waveforms corresponding to power management transients. For example, the waveforms of FIG. 2 correspond to power consumption circuitry 20 transitioning from a low power state to full power operation. (Note that although not shown in FIG. 2, power management transients also occur when transitioning from full power operation back to low power state.) Therefore, during a power management state, power consumption circuitry 20 operates at a low power state and the supply voltage (Vdd) is at a low power nominal level. The power management state may refer to power consumption circuitry 20 being in an off state, a low power state (such as in a sleep or nap mode), or the like. Upon power up, reset, wake up from a sleep mode, or the like, current is ramped up during a transition time to full power operation which affects the Vdd voltage levels (due at least in part to the large dI that exists between the low power state and full power operation).

For example, when the current levels sit at the low power state level during a power management state, Vdd sits at its low power nominal Vdd level. During the transition time when the current transitions from low power state to full power operation (such as, for example, upon reset or power up), Vdd undershoots below the low power nominal Vdd level. Vdd then continues to oscillate (both undershooting and overshooting) prior to stabilizing at a full power nominal Vdd level (corresponding to full power operation). The same occurs in a transition from full power operation to low power state (not shown) where Vdd first overshoots full power nominal Vdd and then continues to oscillate or ring prior to stabilizing at low power nominal Vdd.)

Both supply voltage overshoots and undershoots can be devastating to power consumption circuitry 20. For example, undershoots can adversely affect speed paths which result in performance loss. Undershoots may also prevent power consumption circuitry 20 from retaining states, thus devastating power consumption circuitry 20. Likewise, overshoots may cause some paths to perform too quickly which may violate hold times defined for power consumption circuitry 20, or may introduce reliability issues such as degradation of the thin oxides of the transistors. Therefore, any level of undershoot and overshoot must be controlled so as to prevent damage to power consumption circuitry 20 and to ensure proper operation of power consumption circuitry 20.

FIG. 3 illustrates current and voltage waveforms corresponding to in-stream power transients. For example, when executing instructions that require resources which consume lower amounts of power, power consumption circuitry 20 is at partial power operation. However, within the stream of instructions, power consumption circuitry 20 may execute high power instructions which are those instructions that require resources that consume larger amounts of power. During these high power instructions, power consumption circuitry 20 operates at high or full power. The current transition between partial power operation and full power operation is less than that of FIG. 2 between low power state and full power operation (thus resulting in a lower dI); however, the transition time is faster between a low power instruction stream and a high power instruction stream meaning dt is smaller. Therefore, since Vdd is proportional to the rate of change of the current over time (dI/dt), a short transition time corresponds to a smaller dt value which likewise causes Vdd to oscillate (i.e. ring) about its partial power nominal VDD level prior to stabilizing at or about full power nominal Vdd. Once again, this ringing introduces supply voltage undershoots and overshoots which may be damaging to power consumption circuitry 20.

FIG. 4 illustrates current and voltage waveforms corresponding to cyclical power transients. For example, power consumption circuitry 20 may repeatedly execute a series of instructions which may include both high power instructions and low power instructions. These instructions may result in a repetitive cyclical pattern alternating between high power instructions operating at full power and low power instructions operating at partial power, thus resulting in a cyclical current consumption wave, as illustrated in FIG. 4. This cyclical pattern may match up with the resonating frequency of power supply network of system 10, causing Vdd to overshoot and undershoot at a continuously increasing rate with each cycle period. This would result in catastrophic voltage overshoot and undershoot within power consumption circuitry 20, as seen in FIG. 4. (Note that the power supply network of system 10 refers to the electrical network formed by power supply 12, board power interconnect 11, board decoupling structures 16, package interconnect 14, integrated circuit capacitive decoupling structures 18, and integrated circuit power interconnect 22. In alternate embodiments, the power supply network may include more or less elements than those listed above.)

Each of the problems illustrated in FIGS. 2–4 may result in devastating effects on power consumption circuitry 20, and a need exists to address each of these situations. Furthermore, many of the problematic transients occur unpredictably within power consumption circuitry 20 and can therefore not be prevented beforehand. For example, FIGS. 3 and 4 may be caused by a particular series of instructions within an instruction stream which can occur without notice. Also, since various different instructions streams may cause these problems, it is conceivable that one can intentionally design such instruction streams and thereby create devastating computer viruses. Furthermore, no specific instructions are required to create devastating instruction streams meaning that a large variety of design choices are available to create viruses that can attack any type of power consumption circuitry 20. Therefore, microprocessors, microcontrollers, or other integrated circuits which do not account for or control such supply voltage undershoots and overshoots (both predictable and non-predictable ones) are susceptible to those dangerous computer viruses.

For example, these viruses (i.e. dangerous sections of code) may be sent to a personal computer (PC) processor where they may iteratively attempt and eventually succeed in causing the current to oscillate at the resonating frequency of the PC processor thus resulting in catastrophic overshoot or undershoot that destroy the PC processor. Alternatively, these viruses may be written to create fast or large power transitions causing dangerous overshoots or undershoots of the supply voltage and irreparably damaging the PC processor. Thus a single person can globally distribute a computer virus to any computer coupled to the internet that could cause irreparable damage. Furthermore, the magnitude of the problem caused by such voltage supply overshoots and undershoots increases as clock speeds get higher. (For example, as clock speeds increases, the resonating frequencies generally decrease due to the use of more decoupling devices. This makes the power transitions within an instruction stream more susceptible to overshoots, undershoots, and resonating frequency oscillations.)

In order to address the problem introduced in FIG. 2, power consumption by power consumption circuitry 20 may be intermittently interrupted in order to reduce dI/dt by increasing dt. Power consumption may be interrupted by stopping either the global or any local clocks, stalling the processor pipeline within power consumption circuitry 20, interrupting issuing of new instructions, or powering down portions of power consumption circuitry 20. Therefore, any means of reducing power consumption may be utilized to interrupt power consumption and control the current demand of power consumption circuitry 20.

Figure 5:
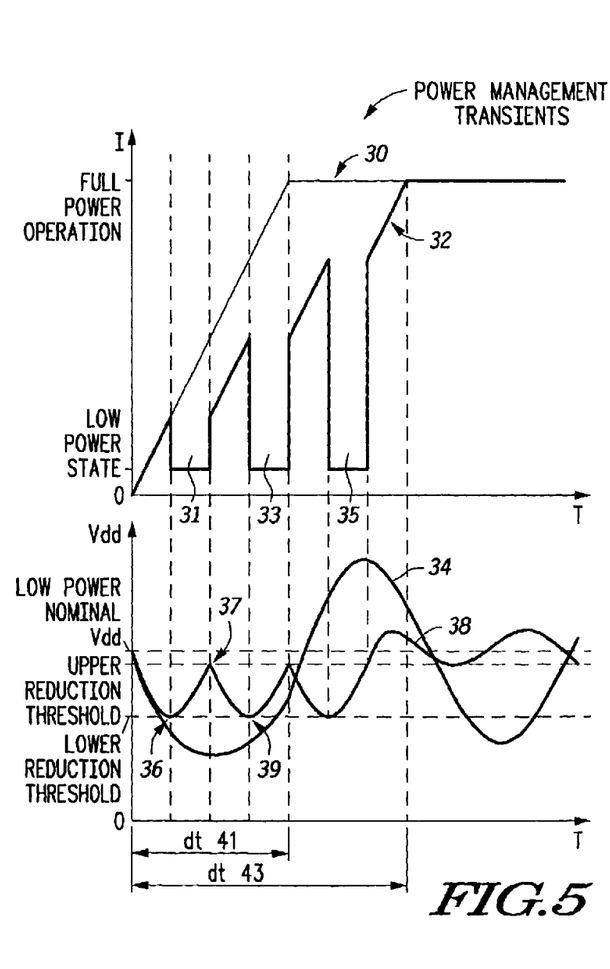
FIGS. 5–7 illustrate current and voltage waveforms in accordance with embodiments of the present invention.

FIG. 5 illustrates a transition from low power state to full power operation including interruptions in power consumption. The changes in current cause changes in Vdd. Current waveform 30 and voltage waveform 34 correspond to the power management transients of FIG. 2. Utilizing embodiments of the present invention which interrupt power consumption of power consumption circuitry 20, the resulting current waveform is waveform 32 and the corresponding voltage waveform is 38. Note that voltage waveform 38 no longer includes the same amount of undershoot and overshoot as voltage waveform 34. That is, voltage waveform 38 results in a controlled ringing that remains within a predetermined tolerance, as allowed by power consumption circuitry 20.

FIG. 5 also illustrates an upper reduction threshold and a lower reduction threshold for Vdd. Therefore, whenever Vdd falls below the lower reduction threshold (in response to the increasing I), power consumption is interrupted (thereby reducing current demand) as illustrated in FIG. 5 when voltage waveform 38 goes from low power nominal Vdd down to the lower reduction threshold (at point 36). Power remains interrupted as illustrated by the flat portion (portion 31) of waveform 32 until the voltage waveform increases and hits the upper reduction threshold (at point 37). Upon reaching the upper reduction threshold, normal power consumption is resumed and the transition to full power operation continues from the same power level from which it left off just prior to power consumption being interrupted, as illustrated by the ramping portion of waveform 32 (immediately following portion 31). Vdd once again decreases until reaching the lower reduction threshold (at point 39) at which point power consumption is again interrupted (portion 33). Eventually, Vdd will no longer decrease and exceed the threshold values, and the voltage waveform will eventually stabilize about a full power nominal Vdd level. Therefore, the interruption of power consumption shifts the transition during each interruption and the total dt 43 is now greater than the dt 41 without the interruptions, thus resulting in a decreased dI/dt and a controlled voltage supply undershoot.

Figure 6:
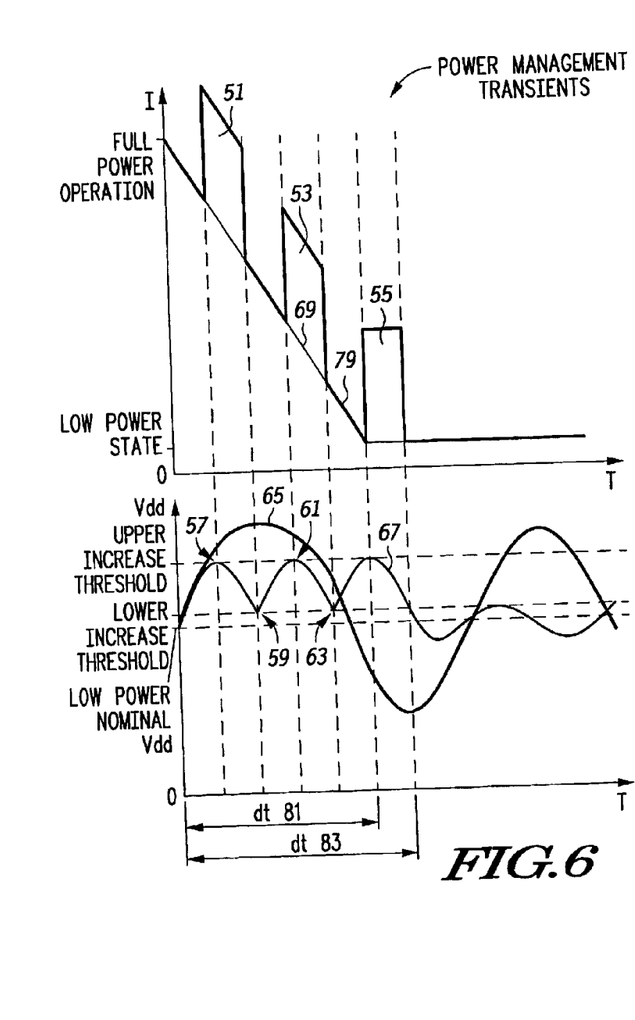

FIG. 6 illustrates power consumption circuitry 20 transitioning from full power operation back down to the low power state. Note that the waveforms are simply the inverse of the waveforms of FIG. 5. Current waveform 69 and voltage waveform 65 correspond to the power management transients problem discussed above (note that these waveforms 69 and 65 are the inverses of the current and voltage waveforms of FIG. 2). Utilizing embodiments of the present invention which intermittently increase power consumption of power consumption circuitry 20, the resulting current waveform is waveform 79 and the corresponding voltage waveform is 67. Therefore, in order to reduce dI/dt, power consumption may be intermittently increased, as will be discussed further below. Power consumption (i.e. current demand) of power consumption circuitry 20 may be increased by turning on (i.e. powering up) idle blocks within power consumption circuitry 20, issuing high power instructions, turning on a power dissipation load, or the like. Therefore, dI/dt is increased by increasing dt, which helps control voltage ringing.

FIG. 6 also illustrates an upper increase threshold and a lower increase threshold for Vdd. Therefore, whenever Vdd rises above the upper increase threshold (in response to the decreasing I), power consumption is increased (thereby increasing current demand) as illustrated in FIG. 6 when voltage waveform 67 goes from high power nominal Vdd up to the upper increase threshold (at point 57). Power remains increased as illustrated by the elevated portion (portion 51) of waveform 79 until the voltage waveform 67 decreases and hits the lower increase threshold (at point 59). Upon reaching the lower increase threshold, normal power consumption is resumed and the transition to low power state continues from the point where the power consumption would have been if it had continued without the intermittent increase, as illustrated by the decreasing portion of waveform 79 (immediately following portion 51). Vdd once again increases until reaching the upper increase threshold (point 61) at which point power consumption is again increased (portion 53). Eventually, Vdd will no longer increase and exceed the upper increase threshold value, and the voltage waveform 67 will eventually stabilize about a low power nominal Vdd level. Therefore, the intermittent increases in power increases the total transition time such that the total dt 83 is now greater than the dt 81 without the intermittent increases in power, thus resulting in a decreased dI/dt and a controlled voltage supply overshoot.

Likewise, in order to address the problem illustrated in FIG. 3, power consumption may be intermittently interrupted or intermittently increased, as was described in reference to FIGS. 5 and 6, depending on whether the current transition is from partial power operation to full power operation or full operation to partial power operation, respectively. By intermittently interrupting or increasing power consumption, the transition time (i.e. dt) between low power instruction streams and high power instruction streams or between high power instruction steams and low power instruction streams, respectively, is increased, thus decreasing the overall dI/dt. As illustrated in FIGS. 5 and 6, this controls the ringing effect of Vdd resulting from the faster current transitions between power levels.

Figure 7:
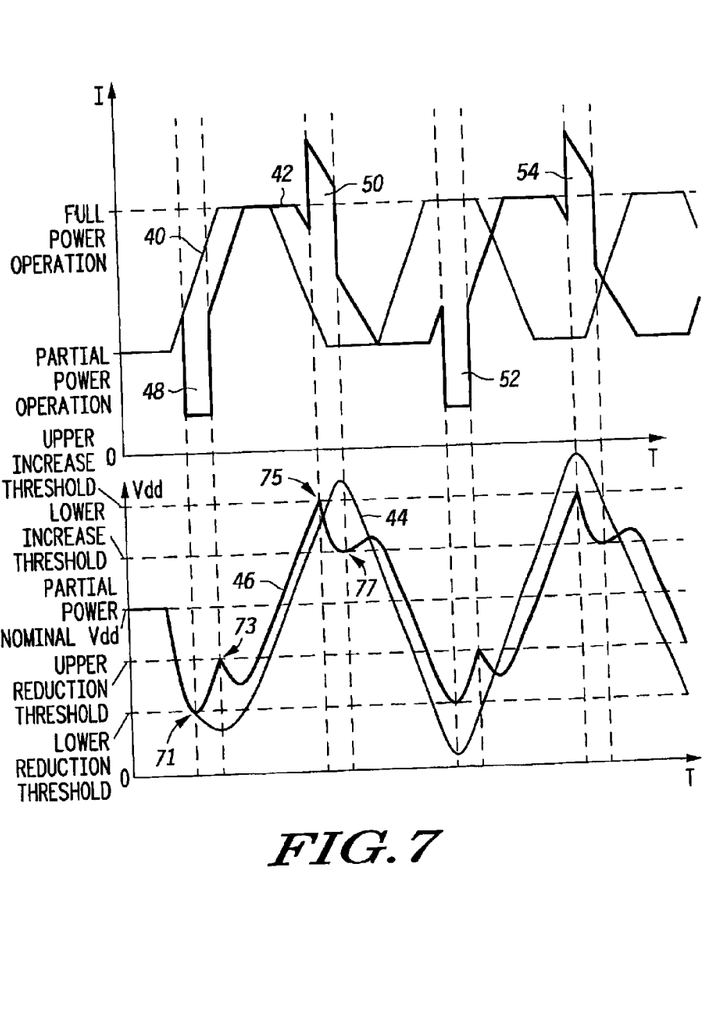

FIG. 7 illustrates the intermittent interruption of power consumption circuitry in order to address the problem illustrated in FIG. 4. In order to prevent the catastrophic voltage overshoot or undershoot caused by the cyclical repetition of high power and low power instructions matching the resonating frequency of the power supply network of system 10, power consumption may be interrupted (e.g. portions 48 and 52) which results in phase shifting the resulting cyclical pattern such that it does not match with the resonating frequency of power consumption circuitry 20. Furthermore, the power consumption may be intermittently increased (portions 50 and 54) which, together with the intermittent interruptions (portions 48 and 52), control any ringing of Vdd. Each time Vdd reaches a corresponding threshold, power is either reduced, increased, or returned to normal power consumption. As the current transitions from partial power operation to full power operation (i.e. transitions from executing low power instructions to high power instructions), Vdd decreases until reaching the lower reduction threshold (at point 71) at which point power consumption is interrupted (e.g. portion 48). Vdd then increases until reaching the upper reduction threshold (at point 73) at which point normal power consumption by power consumption circuitry 20 is resumed. As the current continues to transition to full power operation, Vdd continues to respond normally to the current consumed by power consumption circuitry 20 until one of the upper increase threshold or the lower reduction threshold is reached.

In the embodiment illustrated in FIG. 7, the next threshold reached by Vdd that causes a change in current demand is the upper increase threshold (at point 75) at which point power consumption is increased (portion 50). The increase in power is terminated when Vdd reaches the lower increase threshold (at point 77) at which point normal Vdd response resumes. Note that during the portions where power consumption is interrupted (e.g. portions 48 and 52), the resulting waveform 42 is shifted by an amount of time equivalent to the duration of the interruption, thus continuously phase shifting waveform 42. The periods during which power consumption is increased (e.g. portions 50 and 54) may not result in further phase shifting the waveform; however, they aid in controlling the voltage ringing effect as illustrated with waveform 46. Therefore, the combination of power interrupted portions 48 and 52 and power increase portions 50 and 54 help ensure that the current waveform never matches the resonating frequency for extended periods of time and helps control the ringing effect of Vdd by ensuring that the levels remain within acceptable levels. Note that although FIG. 7 illustrates only one interrupt or increase during each partial power/full power transition, the voltage thresholds may be designed to produce any number of interruptions or increases in power consumption.

Figure 8:
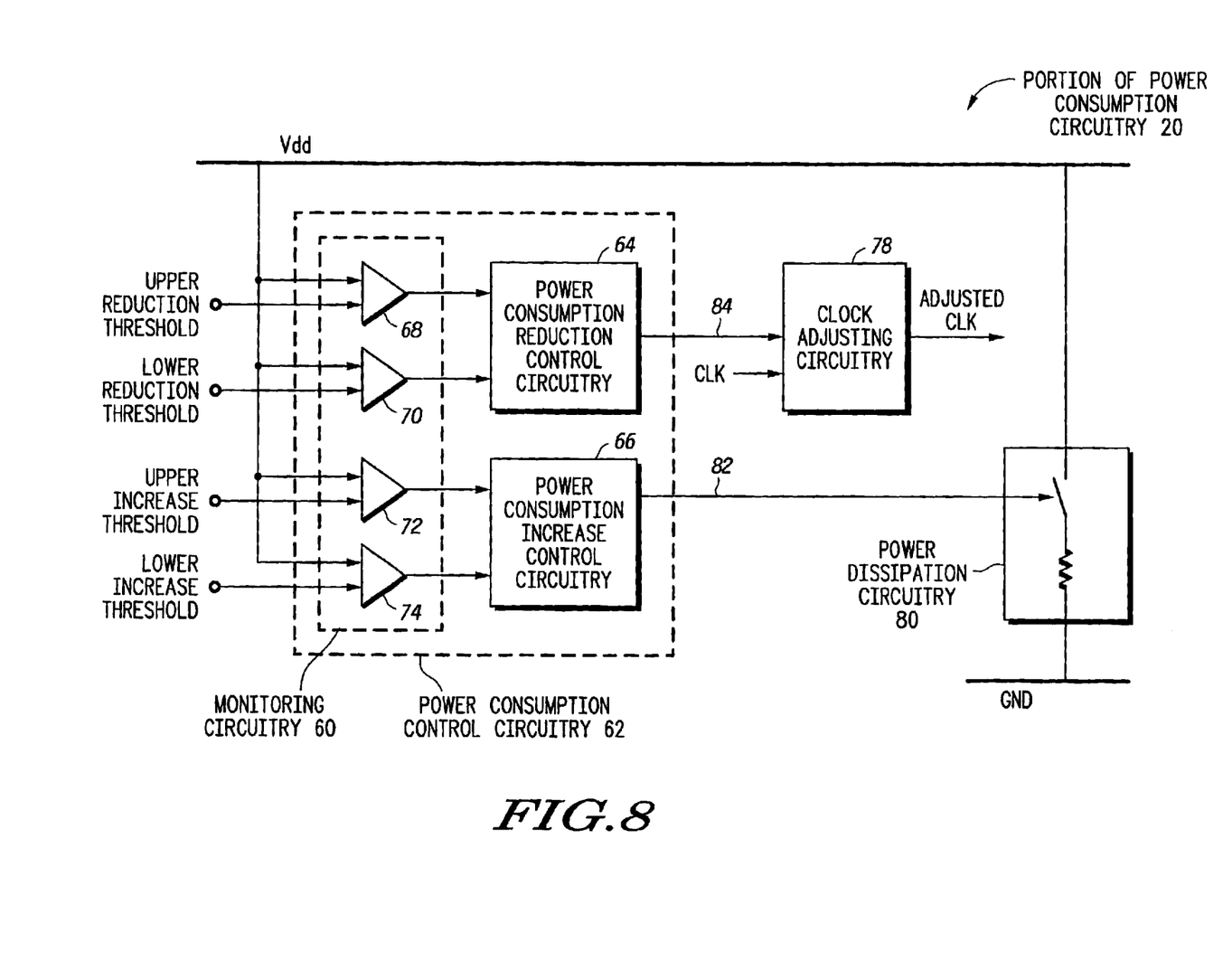
FIG. 8 illustrates, in block-diagram form, a portion of power consumption circuitry of FIG. 1, according to one embodiment of the present invention.

FIG. 8 illustrates, in block-diagram form, a portion of power consumption circuitry 20 which includes power consumption control circuitry 62 which includes monitoring circuitry 60, power consumption reduction control circuitry 64, and power consumption increase control circuitry 66. Power consumption control circuitry 62 receives the upper reduction threshold, lower reduction threshold, upper increase threshold, and lower increase threshold in order to interrupt or increase power consumption as necessary (as was described in reference to FIGS. 5–7). Therefore, comparators 68, 70, 72, and 74, within monitoring circuitry 60, each receive Vdd and a threshold value and provides a control signal to power consumption reduction control circuitry 64 or power consumption increase control circuitry 66. For example, comparators 68 and 70 each provide a control signals to reduction control circuitry 64, and comparators 72 and 74 each provide control signals to increase control circuitry 66. These control signals are therefore asserted when the corresponding threshold is reached.

Reduction control circuitry 64 provides a control signal 84 to clock adjusting circuitry 78. Control signal 84 is asserted in response to the inputs to reduction control circuitry 64. For example, control signal 84 may be asserted when the lower reduction threshold is reached. Clock adjusting circuitry 78 also receives CLK (a clock signal) and outputs ADJUSTED CLK (the adjusted clock signal). For example, in one embodiment, clock adjusting circuitry 78 can be clock gating circuitry where ADJUSTED CLK is a gated clock signal. CLK can be any clock signal within power consumption circuitry 20. For example, it can be a global clock or a local clock. Also, clock adjusting circuitry 78 can adjust any clock signal further downstream within power consumption circuitry 20. For example, clock adjusting circuitry 78 can enable existing power management circuitry within power consumption circuitry 20 in order to adjust the clocks. Alternatively, clock adjusting circuitry 78 can be replaced with other power interrupting circuitry, such as, for example, pipe stalling circuitry that causes the pipeline within power consumption circuitry to stall rather than interrupting any clock signals. Furthermore, other power interrupting circuitry can be used that delays or stalls any other available type of architecture circuitry other than the pipeline. In alternate embodiments, any other circuitry may be used in place of clock adjusting circuitry 78 that interrupts power consumption (i.e. current demand) of power consumption circuitry 20.

Increase control circuitry 66 provides a control signal 82 to power dissipation circuitry 80. Power dissipation circuitry 80 is coupled between Vdd and ground and is modeled as a resistor. Control signal 82 is asserted in response to the inputs to increase control circuitry 66, such as, for example, when upper increase threshold is reached. When control signal 82 is asserted, power dissipation circuitry 80 is enabled which increases power consumption (i.e. current demand) of power consumption circuitry 20. Power dissipation circuitry 80 can be an existing portion of power consumption circuitry 20 that can also be used to dissipate power as needed. For example, power dissipation circuitry 80 may include idle blocks of circuitry that are powered up in order to increase power consumption. In alternate embodiments, power dissipation circuitry 80 may be circuitry available on power consumption circuitry 20 that is used for no other function than to increase power consumption.

FIG. 8 can be better understood in reference to FIGS. 5–7. For example, as illustrated in FIGS. 5–7, when Vdd reaches the lower reduction threshold value, comparator 70 asserts its control signal to reduction control circuitry 64, which, in response to receiving the asserted control signal from comparator 70, asserts control signal 84. Clock adjusting circuitry 78 then enables the power consumption interruption until comparator 68 detects that the upper reduction threshold has been reached, at which point, control signal 84 is deasserted and normal power consumption resumes. Likewise, as also illustrated in FIGS. 5–7, when Vdd reaches the upper increase threshold value, comparator 72 asserts its control signal to increase control circuitry 66, which, in response, asserts control signal 82. Power dissipation circuitry 80 then enables the power consumption increase until comparator 74 detects that the lower increase threshold has been reached, at which point, control signal 82 is deasserted and normal power consumption resumes.

While a four-point control system is illustrated utilizing two sets of upper and lower thresholds, alternative methods based in general control theory may be used. For example, power consumption control circuitry 62 can be designed to not only monitor absolute voltage levels but monitor rate of voltage change. Alternatively, alternate control systems may incrementally change the power dissipation of any power dissipation circuitry such as power dissipation circuitry 80, and likewise incrementally decrease power consumption by a power consumption circuitry such as power consumption circuitry 20. Therefore, more intelligent control systems may be utilized to achieve more control. Alternatively, the current controls of FIG. 8 may be simplified by combining some threshold voltage levels and using a single value. For example, rather than utilizing a separate upper reduction threshold and lower reduction threshold, they may be combined into a single reduction threshold value. Likewise, upper increase threshold and lower increase threshold may also be combined into a single increase threshold value. Therefore, the block diagram of FIG. 8 is simply one illustration of one embodiment, but may be either more simplified or more complex, depending on the amount of control desired. Also, in alternate embodiments, any threshold values used within power consumption circuitry 20 may be user programmable rather than fixed. This allows for a greater degree of flexibility for the user.

In the foregoing specification, the invention has been described with reference to specific embodiments. However, one of ordinary skill in the art appreciates that various modifications and changes can be made without departing from the scope of the present invention as set forth in the claims below. For example, although embodiments of the present invention have been described generally in reference to microprocessors, the power consumption control circuitry may be used to control the current demand of any integrated circuit and is not limited to microprocessors. Also, while power consumption control circuitry 62 is illustrated in FIG.

8 as directly detecting power supply voltage, other means of determining the power supply voltage (Vdd) may be utilized, such as by sensing at least one of power supply current, power, signal delay, and signal frequency. Accordingly, the specification and figures are to be regarded in an illustrative rather than a restrictive sense, and all such modifications are intended to be included within the scope of present invention.

Although the invention has been described with respect to specific conductivity types or polarity of potentials, skilled artisans appreciate that conductivity types and polarities of potentials may be reversed.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling current demand in an integrated circuit, the integrated circuit having power consumption circuitry, the method comprising the steps of:

detecting if at least one of a predetermined overshoot and a predetermined undershoot is present or anticipated in a power supply voltage; and if one of the predetermined overshoot or predetermined undershoot is detected in the power supply voltage, controlling current consumed by the power consumption circuitry by selectively phase shifting current in the power consumption circuitry to ensure that the power supply voltage will remain within a predetermined margin of a predetermined power supply voltage level.

2. The method of claim 1, wherein said step of detecting comprises a step of:

determining the power supply voltage directly.

3. The method of claim 1, wherein said step of detecting comprises a step of:

determining the power supply voltage by sensing at least one of power supply current, power, signal delay, and signal frequency.

4. The method of claim 1, wherein said step of detecting comprises a step of:

comparing the power supply voltage to a reference voltage.

5. The method of claim 4, wherein said step of comparing comprises steps of:

comparing the power supply voltage to a first reference voltage; and if the power supply voltage is lower than the first reference voltage, detecting that the predetermined undershoot has occurred.

6. The method of claim 5, wherein said step of comparing further comprises steps of:

comparing the power supply voltage to a second reference voltage; and if the power supply voltage is higher than the second reference voltage, detecting that the predetermined overshoot has occurred.

7. The method of claim 6, wherein the first reference voltage is lower than a nominal power supply voltage and the second reference voltage is higher than the nominal power supply voltage.

8. The method of claim 1, wherein the step of detecting is performed by power consumption control circuitry located on the integrated circuit.

9. The method of claim 1, wherein said step of controlling does not require use of decoupling capacitors.

10. The method of claim 1, wherein said step of controlling further comprises step of:

performing one of stopping and starting a clock provided to at least a portion of the power consumption circuitry.

11. The method of claim 1, wherein at least one parameter used in said step of controlling is user programmable.

12. The method of claim 1, wherein said step of controlling further comprises a step of adjusting a clock provided to at least a portion of the power consumption circuitry.

13. An integrated circuit, comprising:

a capacitive decoupling structure for providing current when the power supply voltage level is decreasing and for consuming current when the power supply voltage is increasing;

power consumption circuitry for consuming power; and power consumption control circuitry for controlling current consumed by at least a portion of the power consumption circuitry by selectively phase shifting current in the power consumption circuitry, said power consumption control circuitry being coupled to said power consumption circuitry.

14. The integrated circuit as in claim 13, wherein said power consumption control circuitry comprises:

power consumption reduction control circuitry for reducing the current consumed by at least a portion of the power consumption circuitry; and power consumption increase control circuitry for increasing the current consumed by at least a portion of the power consumption circuitry.

15. The integrated circuit as in claim 14, further comprising:

power dissipation circuitry, coupled to receive at least one control signal from said power consumption increase control circuitry, said power dissipation circuitry selectively dissipating power.

16. The integrated circuit as in claim 14, wherein said power consumption control circuitry further comprises:

monitoring circuitry for comparing a power supply voltage to a predetermined voltage, said monitoring circuitry being coupled to said power consumption reduction control circuitry and to said power consumption increase control circuitry.

17. The integrated circuit as in claim 14, wherein the predetermined voltage is one of a plurality of voltages, wherein the plurality of voltages comprises an upper reduction threshold voltage, a lower reduction threshold voltage, an upper increase threshold voltage, and a lower increase threshold.

18. The integrated circuit as in claim 13, further comprising:

clock adjusting circuitry, coupled to receive at least one control signal from said power consumption increase control circuitry, said clock adjusting circuitry adjusting a clock signal which is provided to at least a portion of the power consumption circuitry.

19. The integrated circuit as in claim 18, wherein said clock adjusting circuitry selectively interrupts the clock signal which is provided to the at least a portion of the power consumption circuitry.

* * * * *